(12) United States Patent
Kwong et al.

(10) Patent No.: US 6,289,506 B1
(45) Date of Patent: *Sep. 11, 2001

(54) METHOD FOR OPTIMIZING JAVA PERFORMANCE USING PRECOMPILED CODE

(75) Inventors: Alice Kwong, Los Altos; Michael Lai, Sunnyvale; James W. O'Neill, Campbell; Julie Wang, Sunnyvale, all of CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,702

(22) Filed: Jun. 30, 1998

(51) Int. Cl.$^7$ ......................................................... G06F 9/45
(52) U.S. Cl. .................................................. 717/9; 4/5; 4/7
(58) Field of Search .................................. 395/704, 705, 395/706, 709, 708; 717/4–9; 714/34, 38; 703/22, 26

(56) References Cited

U.S. PATENT DOCUMENTS

| | | | |
|---|---|---|---|
| 5,367,685 | 11/1994 | Gosling | 717/7 |
| 5,465,258 * | 11/1995 | Adams | 395/704 |
| 5,539,907 * | 7/1996 | Srivastava et al. | 395/705 |
| 5,590,331 * | 12/1996 | Lewis et al. | 395/708 |
| 5,668,999 | 9/1997 | Gosling | 717/4 |
| 5,768,592 * | 6/1998 | Chang | 395/704 |
| 5,768,593 * | 6/1998 | Walters et al. | 395/705 |
| 5,842,017 * | 11/1998 | Hookway et al. | 395/707 |
| 5,905,895 * | 5/1999 | Halter | 395/709 |
| 5,909,577 * | 6/1999 | Devanbu | 395/704 |
| 5,995,754 * | 9/1999 | Holzle et al. | 395/709 |
| 6,170,083 * | 1/2001 | Adl-Tabatabai | 717/9 |

OTHER PUBLICATIONS

Bothner, "A Gcc–basedJava Implementation", IEEE 1997, pp. 174–178.*

Cierniak et al., "Briki: An Optimizing Java compiler", Compcon Proceedings,IEEE, 1997, pp. 179–184.*

Hsieh et al., "Java Bytecode to Native Code Translation: The Caffeine Prototype and Preliminary Results", IEEE, 1996, pp. 90–97.*

Hsieh et al., "Optimizing NET Compilers for Improved Java Performance", IEEE 1997, pp. 67–75.*

James Gosling, et al., The Java Language Specification, Published by Addison–Wesley, 1996, pp. 29–49.

Tim Lindholm, et al., The Java Virtual Machine Specification, Published by Addison–Wesley, 1997, pp. 57–82.

Alfred V. Aho, et al., Compilers–Principles, Techniques, and Tools, Published by Addsion–Wesley, 1988, pp. 1–24.

(List continued on next page.)

*Primary Examiner*—Kakali Chaki
(74) *Attorney, Agent, or Firm*—Peter Lam

(57) ABSTRACT

Compilers are tools that generate efficient mappings from programs to machines A Java "Just In Time" runs as part of an application, and as such, it must be fast and efficient in its use of memory. To achieve good performance and further optimize code generation, the present invention introduces a method for optimizing Java performance using precompiled code. The method of the present invention first monitors the performance of program code during program execution. Then a list of program functions for possible native code compilation is created. The list may be created based upon static and dynamic analysis of the computer program. A plurality of program functions from said list of program functions is selected for optimization and native compilation. The selected program functions are precompiled into native program functions. The present invention also allows the precompiled native code reverted so that a user could explore the performance tuning until satisfactory.

32 Claims, 12 Drawing Sheets

OTHER PUBLICATIONS

Steven S. Muchnick, Advanced Compiler Design & Implementation, Published by Morgan Kaufmann, 1997, pp. 1–18, 319–328.

Douglas Kramer, The Java Platform–A White Paper, Published by Javasoft, 1996, pp. 6–24.

P. Tyma; "Tuning Java Performance", Dr. Dobb's Journal, vol. 21, No. 4, pp. 52–58.

D. Bell; "Make Java Fast: Optimaze", Javaworld (online). Retrieved from :<http:/www.javaworld.com> Jun. 22, 1999.

Jansen, et al.; "Security and Dynamic Class Loading in Java: a Formalisation" IEEE/IEE Electronic Library (online).

Aho, et al.; "Compilers, Principles, Techniques, and Tools", Addison–Wesley Publishing Co., Ch. 9 and 10.

Ciemiek, et al.; "Briki: An Optimizing Java Compiler", IEEE/IEE Electronic Library (Online) Proceedings of IEEE Compcon '97, pp. 179–184.

E. Armstrong, "HotSpot: A New Breed of Virtual Machine", Javaworld (online). Retrieved from <http:/www.javaworld.com> on Jun. 22, 1999.

Bacon, et al.; "Compiler Transformations and High–Performance Computing", ACM Computing Surveys, vol. 25, No. 4, 12/94, pp. 345–420.

Bothner, "A Gcc–Based Java Implementation", Cygnus Solutions, IEEE, 1963, pp. 174–178.

* cited by examiner

| classfile_name 1110 | fully_qualified_method_name 1112 | weight 1114 |

FIG. 11A

| Classfile Name | Fully Qualified Method Name |
|---|---|
| 1120 myFrame.class | myFrame.handleEvent(Ljava/awt/Event;)Z |
| 1122 native_Point.class | native_Point.Point(DDI)I |

FIG. 11B

| Classfile Name | Fully Qualified Method Name | Weight |
|---|---|---|
| 1130 myFrame.class | myFrame.handleEvent(Ljava/awt/Event;)Z | 0 |
| 1132 native_Point.class | native_Point.Point(DDI)I | 100 |

FIG. 11C

METHOD FOR OPTIMIZING JAVA PERFORMANCE USING PRECOMPILED CODE

BACKGROUND OF THE INVENTION

1. Field of the Invention

This invention relates to the field of computer software optimization. More particularly, the present invention relates to a method for optimizing Java performance using precompiled code.

2. History of the Prior Art

Computer programs are generally created as source code. The source code is later compiled into object code for program execution. Hence, most programs exist as compiled object code in computer systems. However, the compiled code is usually designed/compiled to operate on only one particular operating system or on only one particular computer architecture. The binary file for an application that runs on one platform cannot run on another platform because the binary file is machine-specific. In order to use a certain program on several different types of computer systems, the original source code must be separately compiled into object code for each different operating system and each different processor architecture.

The popularization of the World Wide Web has exacerbated a problem for software developers trying to create software for networked consumer devices. While millions of people around the globe are surfing the Internet and browsing web pages with their computers, not all of those computers are the same. One person may be using a Macintosh, another a PC, and yet another user with a UNIX machine. Hence software developers may find it desirable to design computer programs that could support multiple host architectures and could allow secure delivery of its software components.

The Java programming language and environment is designed to solve a number of problems in modern programming practice. Java is designed to meet the challenges of application development in the context of heterogeneous, network-wide distributed environments. Paramount among these challenges is secure delivery of applications that consume the minimum of system resources, can run on any hardware and software platform, and can be extended dynamically. Java is a simple, object-oriented, network-savvy, interpreted, robust, secure, architecture neutral, portable, multithreaded, dynamic language.

Java is a strongly typed programming language. A Java program is created by compiling source code written in Java Language's well defined format into a compact, architecture-neutral object code known as Java bytecode. Compilation normally consists of translating Java source code into a machine independent Java bytecode representation. Java bytecodes are translated (interpreted) on the fly into native machine code for the particular CPU the application is running on. Bytecodes are executed at runtime by an interpreter residing on the client computer. Runtime activities may include loading and linking the classes needed to execute a program, machine code generation and dynamic optimization of the program, and actual program execution.

A program written in the Java Language compiles to a bytecode file that can run wherever a Java Platform is present. This portability is possible because at the core of a Java Platform is a Java Virtual Machine. Java bytecodes are designed to operate on a Java Virtual Machine (VM). The Java Virtual Machine is an abstract computing machine that has its own instruction set and uses various memory areas. A Java VM is not an actual hardware platform, but rather a low level software emulator that can be implemented on many different processor architectures and under many different operating systems. A Java VM reads and interprets each bytecode so that the instructions may be executed by the native microprocessor. Hence compiled Java bytecodes are capable of functioning on any platform that has a Java Virtual Machine implementation available.

However, bytecode interpretation detracts from program performance since the microprocessor has to spend part of its processing time interpreting bytecodes. Java "Just In Time" (JIT) compilers were introduced to improve the performance of Java Virtual Machines. A Java JIT compiler translates Java bytecodes into the processor's native machine code during runtime. The processor then executes the compiled native code like any other native program. Such compiled Java programs execute much faster than Java programs that are executed using a Java interpreter Although a Just In Time compiled Java program executes faster than an interpreted Java program, the performance of such Just In Time compiled Java programs can be further improved. In order to harness performance improvements from Java code via JIT compilation, a program's Java bytecodes have to be JIT complied. Since Just In Time compilations are performed during program runtime, the compile time adds to the time constraint during execution time. Furthermore, since the native machine code outputted by a JIT compiler is not saved, the program's Java bytecodes have to be JIT compiled every time the program is loaded and run. JIT compilers also do not produce efficient code since they must quickly produce the code and thus the code is not optimized.

SUMMARY OF THE INVENTION

The present invention introduces a method for optimizing Java performance using precompiled code. The method of the present invention first monitors the performance of program code during program execution. Then a list of program functions for possible native code compilation is created. A plurality of program functions from said list of program functions is selected. The selected program functions are precompiled into native program functions.

Other objects, features, and advantages of the present invention will be apparent from the accompanying drawings and from the detailed description that follows.

BRIEF DESCRIPTION OF THE DRAWINGS

The present invention is illustrated by way of example and not limitations in the figures of the accompanying drawings in which like references indicate similar elements, and in which:

FIG. 11a illustrates the contents of an entry in a list file of candidates for native compiling in one embodiment of the present invention;

FIG. 11b illustrates an example of a list file after static analysis in the compiler in one embodiment of the present invention; and FIG. 11c illustrates an example of a list file after recommendations by a native Java compiler of methods for native compiling in one embodiment of the present invention.

DETAILED DESCRIPTION OF THE INVENTION

Figure 1:
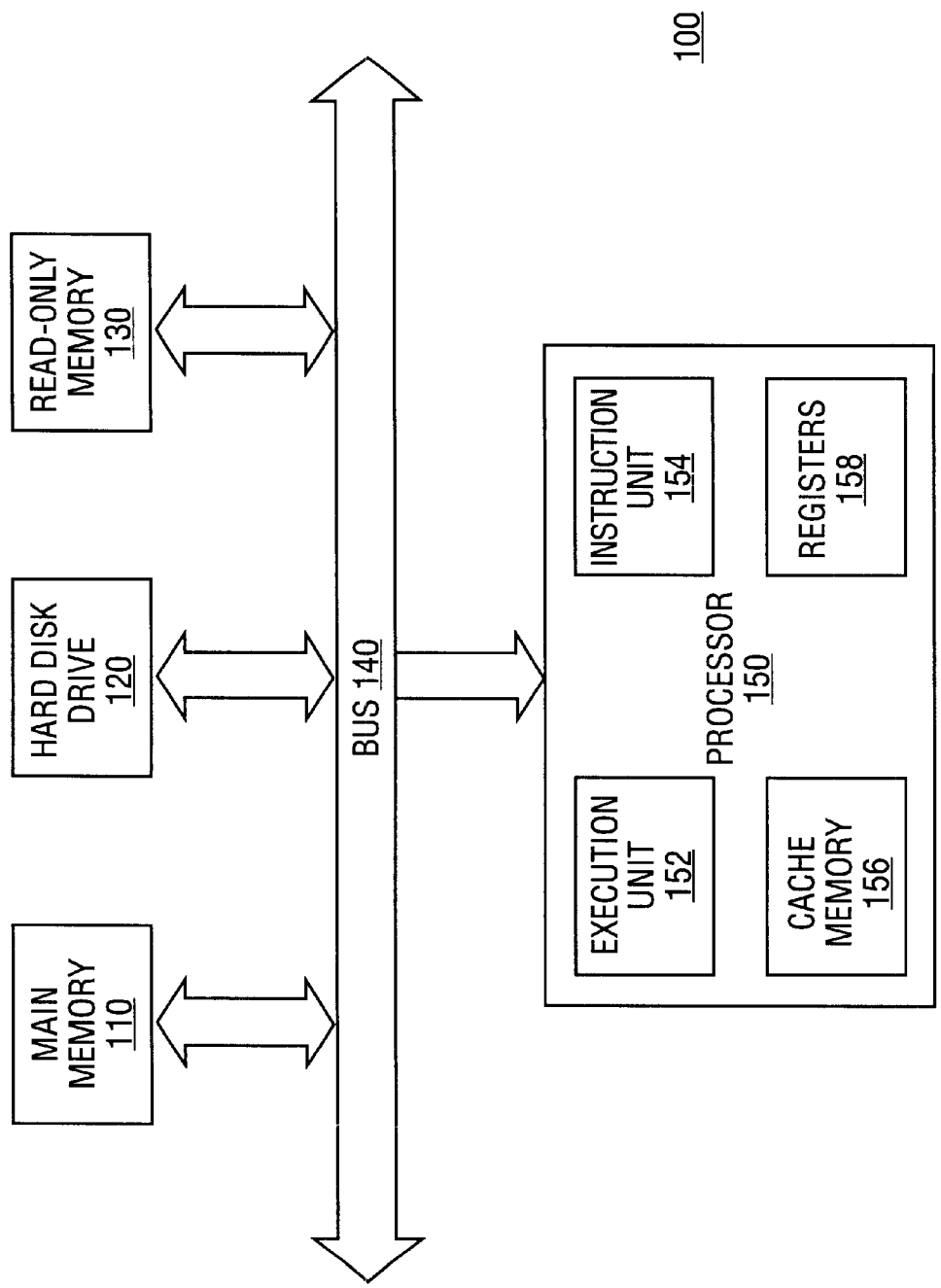
FIG. 1 is a block diagram illustrating a computer system which may utilize the present invention.

A method for optimizing Java performance using precompiled code is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to Java object-oriented programming language. Although the following embodiments are described with reference to the Java programming language and Java "Just-In-Time" (JIT) compilers, other embodiments are applicable to other types of programming languages that use compilers. The same techniques and teachings of the present invention can easily be applied to other types of compiled object code.

A Java compiler converts Java source code into a verifiably secure and compact architecture-neutral intermediate format called Java bytecodes. A Java Virtual Machine (Java VM) later interprets the bytecode instructions at runtime.

In order to improve runtime performance, a JIT compiler may convert bytecodes into native code at runtime. Even though a JIT compiler improves performance, Just-In-Time code generation has a time constraint—code compilation time is part of the run time. JIT compiled code runs faster, but only after being JIT compiled. Since JIT compiled code is not stored after program execution, the bytecodes need to be JIT compiled every time the program is loaded and run. While the traditional methodology of performance measurement used to ignore compilation time, measurements of JIT compiled program execution time must include JIT compilation time. As such, compilation speed becomes much more important in a Java JIT compiler than in a traditional compiler. As a result, it is extremely important for the code optimizations to be effective. Therefore, a method of improving Java performance using precompiled code would be desirable.

The present invention introduces a method of improving Java performance by precompiling Java bytecodes into native machine code. Precompiled code may improve program performance because the Java bytecodes do not have to be translated or compiled every time the program is loaded and executed. Hence, precompiled code may also afford some aggressive optimization techniques which consume more compile time. The precompiled native code may be stored in dynamic linked library (DLL) for later program execution.

In one embodiment of the present invention, a high level performance analysis tool monitors the performance of a Java program or Java applet. An analysis tool may track the Java program methods entered and exited in memory, establish a relationship between parent and child methods called, record every called program method, and time spend in each method. In another embodiment, an analysis tool may keep track of the Java methods being loaded into memory along with active software executing on the system. A tuning tool may determine the most active classes and methods in a Java application and list possible candidates for native compilation. Depending on the calling sequence of Java program methods and their execution time, users may select any arbitrary number of highlighted methods for static compilation. Static analysis by a Java compiler may also be a factor in the selection process. The Java compiler may use heuristics in static analysis—native interface overhead versus optimization gain.

In one embodiment of the present invention, a compiler translates Java bytecodes into native machine object code for program methods that are selected to be native compiled. The native compiled object code may be built into a DLL. Program methods that are native compiled will have their attributes in the class file changed. Additional mechanisms may facilitate the native code compilation by reverting the native bit back to Java method, reporting the attribute state, and adding Java code to load the DLL. After performance tuning, the precompiled Java program methods could run concurrently with the rest of the Java program's bytecodes on a Java Virtual Machine.

A Computer System Application

Referring now to FIG. 1, there is a block diagram illustrating a computer system 100 which may utilize the present invention. The system 100 includes a central processor 150 which carries out the various instructions provided to the computer system 100 for its operations. The central processor 150 comprises of an execution unit 152, and instruction unit 154, cache memory 156, and general registers 158. The central processor 150 is coupled to a bus 140 adapted to carry information to various components of the system 100. Coupled to the bus 140 is main memory 110, which is typically constructed of dynamic random access memory arranged in a manner well known to those skilled in the prior art, to store information during a period in which power is provided to the system 100. Also coupled to the bus 140 is read-only memory 130, which may include various memory devices well known to those skilled in the art, each of which is adapted to retain a particular memory condition in the absence of power to the system 100. The read-only memory 130 typically stores various basic functions used by the processor 150 such as basic input/output processes and start-up processes typically referred to as BIOS processes. Long term memory 120 is also coupled to the bus 140. The construction and operation of long term memory 120, typically electro-mechanical hard disk drives, is well known to those skilled in the art.

The Java Platform

Figure 2:
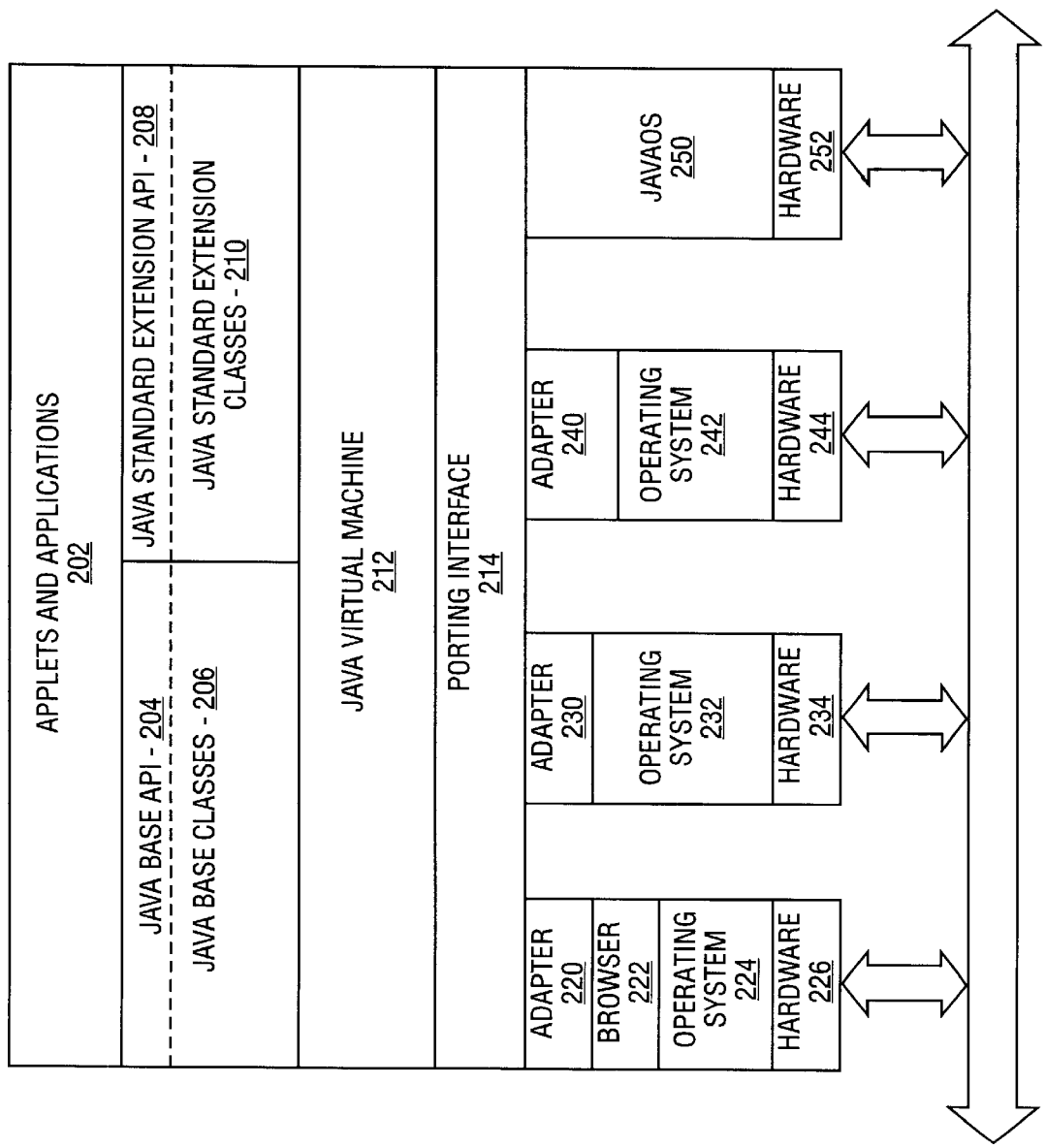
FIG. 2 is a block diagram illustrating the Java Platform across operating systems.

FIG. 2 is a block diagram illustrating the Java platform across some different operating systems. The Java Platform is a software platform for delivering and running highly interactive, dynamic, and secure applets and applications on networked computer systems. The Java Platform sits on top of many other platforms, including Microsoft Windows, Macintosh, OS/2, UNIX, and NetWare, and compiles to bytecodes, which are not specific to any physical machine, but are machine instructions for a Java virtual machine. A program written in the Java Language compiles to a byte-code file that can run wherever the Java Platform is present, on any underlying operating system. The Java Platform has two basic parts: the Java Virtual Machine and the Java Application Programming Interface.

The Java Virtual Machine (Java VM) 212 is a "soft" computer that can be implemented in software or hardware. It is an abstract machine designed to be implemented on top of existing computer processors. The Java Platform's Porting Interface 214 and Adapters 220, 230, 240 enable the Java VM 212 to be easily ported to new operating systems 224, 232, 242, 250 without being completely rewritten.

The Java Application Programming Interface (Java API) 204, 208 forms a standard interface to applets and applications, regardless of the underlying operating system. The Java API specifies a set of essential interfaces in a number of areas that software developers may use to build Java-powered applications. The Java API may be further divided into the Java Base API 204 and the Java Standard Extension API 208. The Java Base API 204 provides the basic language, utility, input/output, network, graphical user interface, and applet services. The Java Standard Extension API 208 extends the capabilities of Java beyond the Java Base API 204. Other nonstandard extension APIs can be provided by the applet, application, or underlying operating system.

The Java Base Platform in FIG. 2 includes the following blocks or components: Java Base API 204, Java Base Classes 206, Java VM 212, Porting Interface 214, and Adapters 220, 230, 240. In this embodiment, the Java API includes both the Java Base API 204 and Java Standard Extension API 208. The classes (Java Base Classes 206 and Java Standard Extension Classes 210) are the implementation of its respective API. The Java VM 212 is at the core of the Java Base Platform. A Java Native Interface (JNI) may exist with the Java VM 212. The Java Native Interface is a standard programming interface for writing Java native methods and embedding the Java VM into native applications. While users write applications entirely in Java, there are situations where Java alone does not meet the needs of an application. Programmers use the JNI to write Java native methods to handle those situations when an application cannot be written entirely in Java. The following examples illustrate when you need to use Java native methods:

The standard Java class library does not support the platform-dependent features needed by the application.

A library may already be written in another language and a programmer wishes to make it accessible to Java code through the JNI.

A programmer may want to implement a small portion of time-critical code in a lower-level language such as assembly.

By programming through the JNI, developers can use native methods to:

Create, inspect, and update Java objects (including arrays and strings).

Call Java methods.

Catch and throw exceptions.

Load classes and obtain class information.

Perform runtime type checking.

The Java Native Interface as described in the above embodiment is only one example of a native method interface. In other embodiments of the present invention, other native method interfaces may be utilized, such as Microsoft's Raw Native Interface (RNI), Netscape's Java Runtime Interface (JRI), and many others.

The Porting Interface 214 lies between the Java VM 212 and the operating system (OS) 224, 232, 242, 250 or browser 222. In this embodiment, the Porting Interface 214 has a platform independent part (Java Base Platform) and a platform dependent part (adapters 220, 230, 240). The OS 224, 232, 242 and JavaOS 250 provide the window, filing, and network functionality. In FIG. 2, four different types of machines are illustrated. The first machine (Java on a Browser) comprises of adapter 220, browser 222, operating system 224, and hardware 226. A second machine (Java on a desktop OS) comprises of adapter 230, operating system 232, and hardware 234. A similar machine (Java on a smaller OS) includes adapter 240, operating system 242, and hardware 244. Yet another machine (Java on JavaOS) may comprise of JavaOS 250 and hardware 252. These and other different machines can all be connected by a network 260.

Running a Java Class File

Figure 3A:
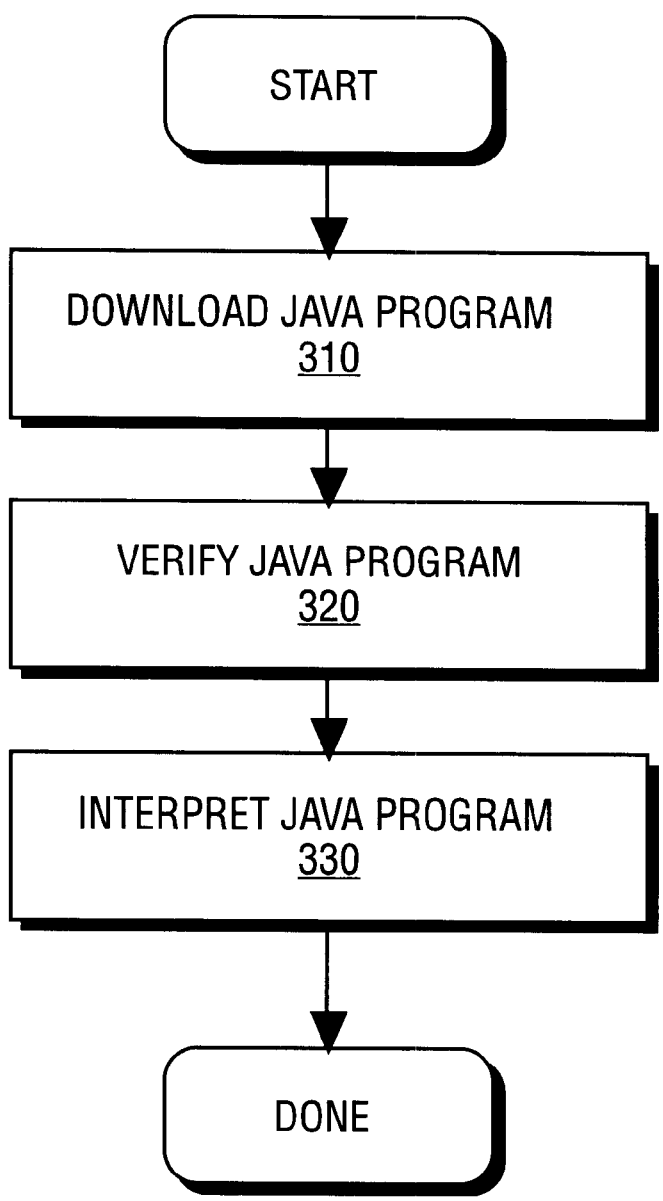
FIG. 3a illustrates a flow diagram that lists the steps of downloading and running a Java program in a Java Virtual Machine with an interpreter.
Figure 4:
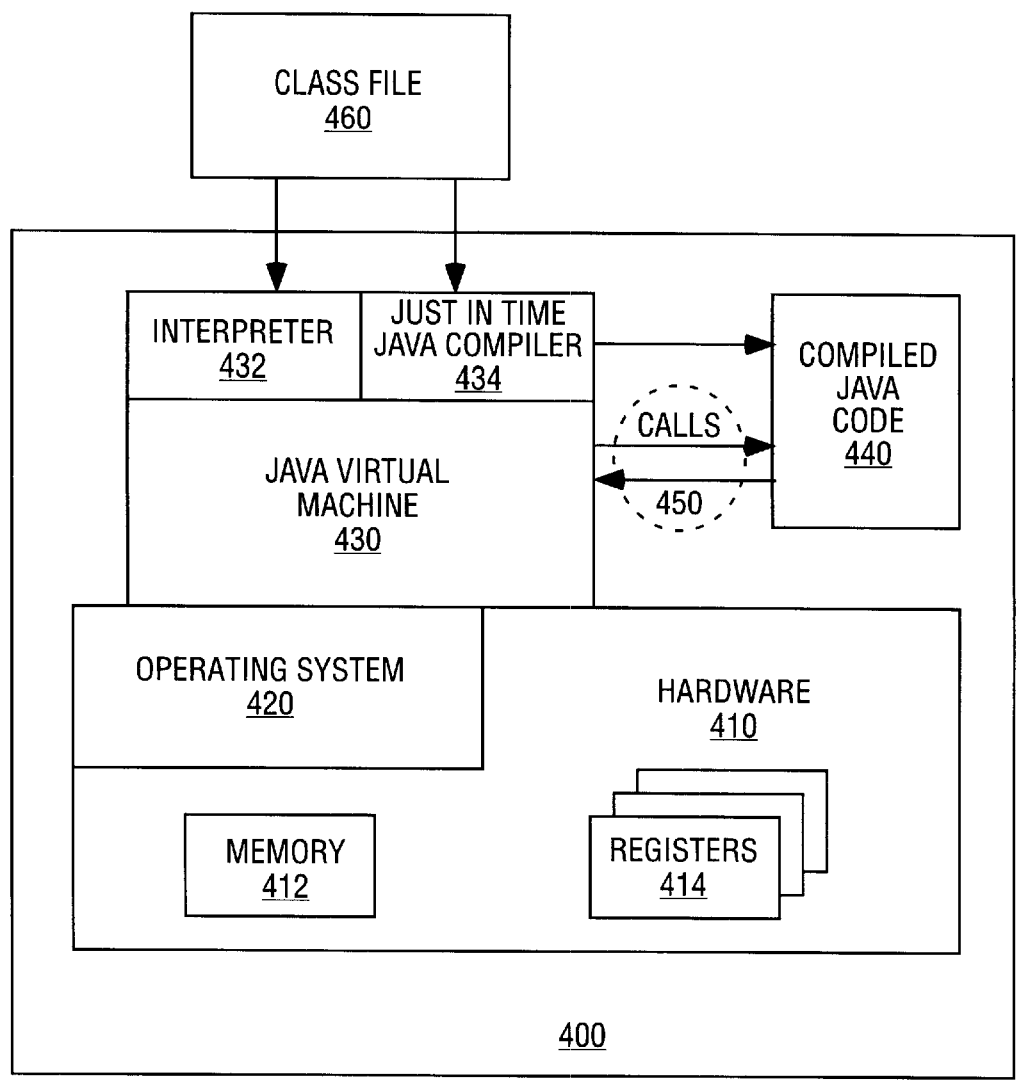
FIG. 4 illustrates a block diagram of a Java Virtual Machine on a client computer system.

An example of running a Java program in a networked computer environment is provided with reference to FIG. 3a and FIG. 4. FIG. 3a illustrates the steps in downloading and running a Java program in a Java VM with an interpreter. FIG. 4 illustrates a block diagram of the elements in a client computer system 400 equipped to interpret and compile Java class files. The client computer system 400 includes computer hardware 410 controlled by an operating system 420. The computer hardware further comprises of computer memory 412 and machine registers 414. The system 400 also includes a Java VM implementation 430 for running Java class files 460. In one embodiment, the Java VM 430 running on the client computer system 400 may rely on services from the underlying operating system 420 and the computer hardware 410. Furthermore, the Java VM 430 may use a Java Interpreter 432 to interpret Java classes 460 or a Java JIT compiler 434 to generate compiled native code.

In a networked environment, a user would first access a computer server through the network and download the desired Java class file 460 into a client computer system 400 as in step 310 of FIG. 3a. After the class file 460 has been downloaded, it is passed into the Java VM 430, which then verifies the downloaded class file at step 320. Step 320 of verifying the class file is to ensure that the program will not cause security violations nor will it cause harm to the computer system resources. After the Java class file has been verified, the interpreter 432 begins interpreting the Java bytecodes of the class file 460. The Java program bytecodes are interpreted in step 330 so that the Java application can be executed. Since the bytecodes being interpreted are generally not native to the processor, the interpretation process tends to be slow. Hence, Java "Just-In-Time" compilation was introduced to improve the performance of Java programs.

Figure 3B:
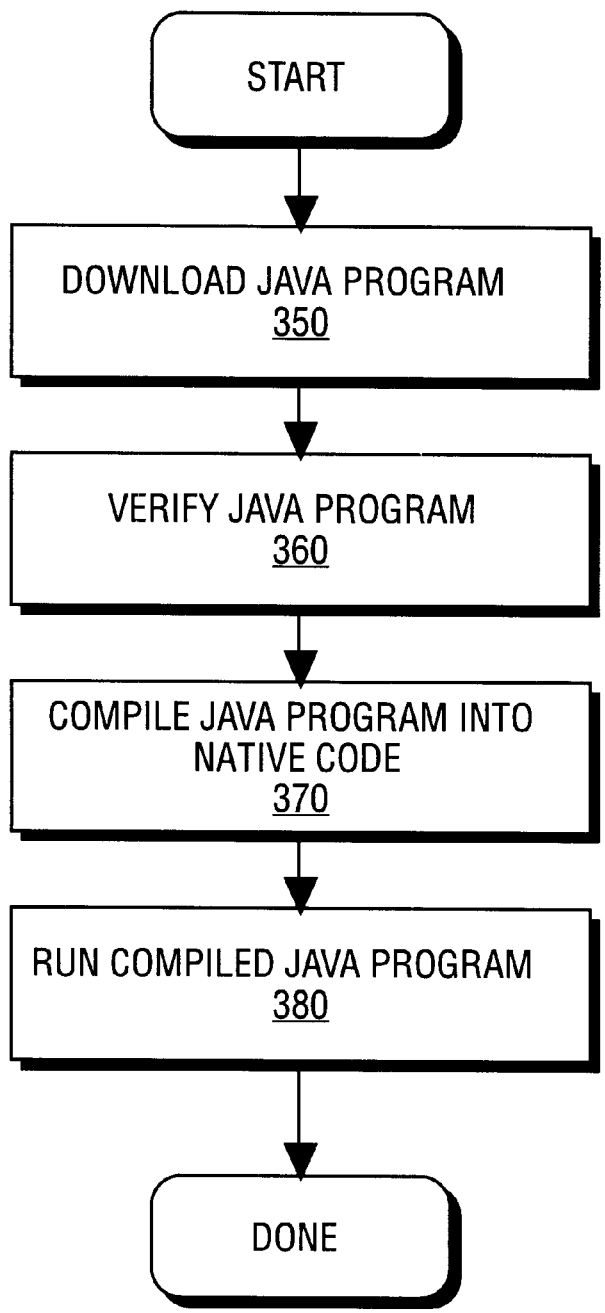
FIG. 3b illustrates a flow diagram that lists the steps of downloading, compiling, and running a Java program in a Java Virtual Machine that compiles the code before execution.

FIG. 3b and FIG. 4 are used to describe how a Java program can be compiled and then executed. FIG. 3b illustrates a flow diagram that lists the steps of downloading, compiling, and running a Java program in a Java VM that compiles the code in native machine code before execution. First, a user accesses a Java class file 460 on a computer network and downloads the class file 460 to a local client computer system 400 as in step 350. Then at step 360, the Java VM 430 verifies the downloaded class file 460. After the Java program has been verified, a Java JIT compiler 434 compiles the Java class file and generates compiled Java code 440 in the form of native processor code at step 370. The compiled Java code 440 is directly executed on the computer hardware 410 at step 380. Java programs which have been compiled and translated into native code execute faster than Java programs that are executed using a Java interpreter because the compiled code is native to the computer processor in the client system 400. In order to maintain the state of the Java VM 430 and make system calls, the compiled Java code 440 may make calls 450 into the Java VM 430.

Although the above example describes the distribution of a Java class file via a network, Java programs may be distributed by way of other computer readable mediums. For instance, a computer program may be distributed through a computer readable medium such as a floppy disk, a CD ROM, a carrier wave, or even a transmission over the internet.

Prior Method For Optimizing Code

Figure 5:
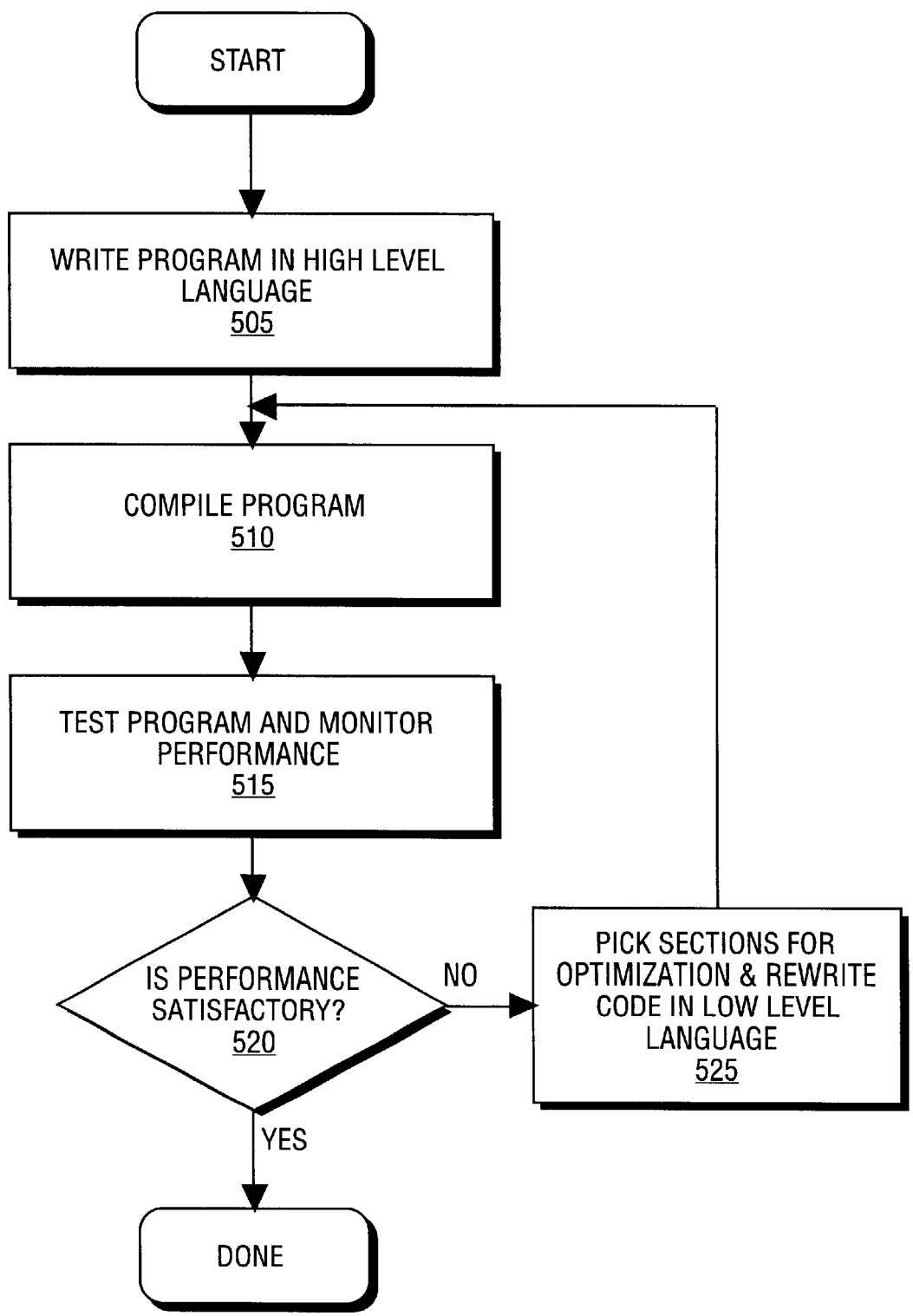
FIG. 5 is a flow chart illustrating the steps of one method for optimizing computer program code.

FIG. 5 is a flow chart illustrating the steps of one method for optimizing computer program code. Software developers may often decide to optimize computer programs in attempt to improve performance. One such code optimization method may entail the steps as shown in FIG. 5. As in step 505, a programmer may first write a program in a high level language like C or C++. Then the program would be compiled at step 510. If the program compiles, the programmer may go on to test/debug the program and analyze its performance at step 515. Performance analysis may include dynamically measuring each function's or Java program method's execution time. If program performance is satisfactory, then the code development process is completed. However, if the performance of the computer program is not satisfactory at step 520, the developer may select certain sections of the program for optimization.

One popular way of optimizing code is to rewrite some functions or procedures in a low level language or native machine code as in step 525. A programmer would have to estimate if rewriting portions of the code in another language could be helpful. If the programmer decides to rewrite the slower functions or program methods, he may also have to add code to perform Java specific checks, resolve any different language semantics, optimize the compiler to eliminate native interface overhead, perform control flow and data flow analysis to optimize Java specific checks, and to implement using a native interface. However, such a process may prove to be tedious and time consuming since the programmer usually has to repeat the steps of compilation 510 and testing 515. This process may also prove to be difficult to perform without a user interface for performance tuning programs. Furthermore, the programmer may not even know if the optimizations were effective or not without more performance analysis. Hence a programmer may repeat the process of rewriting code, compiling, and testing several times before achieving the desired performance if at all.

Java Development Environment

Figure 6:
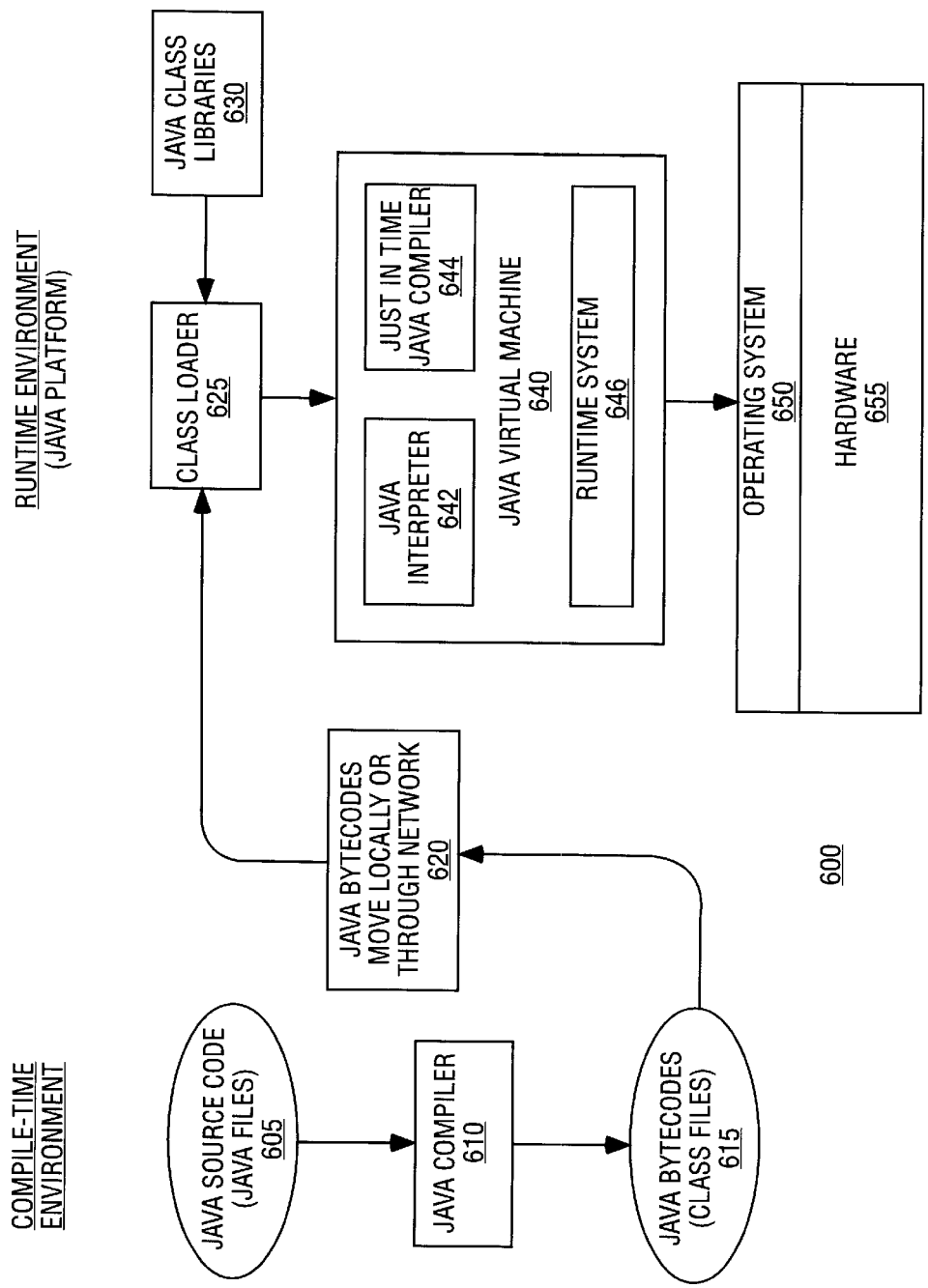
FIG. 6 is a block diagram illustrating the runtime and compile-time environments of a Java Language development environment.

FIG. 6 shows the runtime and compile-time environments of a Java Language development environment 600. A Java Language development environment 600 includes both compile-time and runtime environments. The Java Platform is represented by the runtime environment. A developer writes Java Language source code (.java files) 605 and uses a Java compiler 610 to compile it to bytecodes (.class files) 615. These bytecodes 615 are instructions for a Java VM 640. In order to create an applet, a developer may store these bytecode files 615 on a HTTP server and add an <applet code=filename> tag to a Web page, which names the entry-point bytecode file. When an end user visits that page, the <applet> tag causes the bytecode files to be transported over a network 620 from the server to the end user's browser in the Java Platform. At the Java Platform, the bytecodes are loaded 625 into memory and then verified for security before entry into the Java VM 640. Once the bytecodes are in the Java VM 640, the bytecodes are interpreted by a Java interpreter 642 or turned into native machine code by the JIT compiler 644. The Java interpreter 642 and JIT compiler operate in the context of the runtime system 646 (threads, memory, and other system resources). Any classes from the Java Class Libraries 630 are dynamically loaded as needed by the applet.

Optimizing Using Precompiled Code

Figure 7:
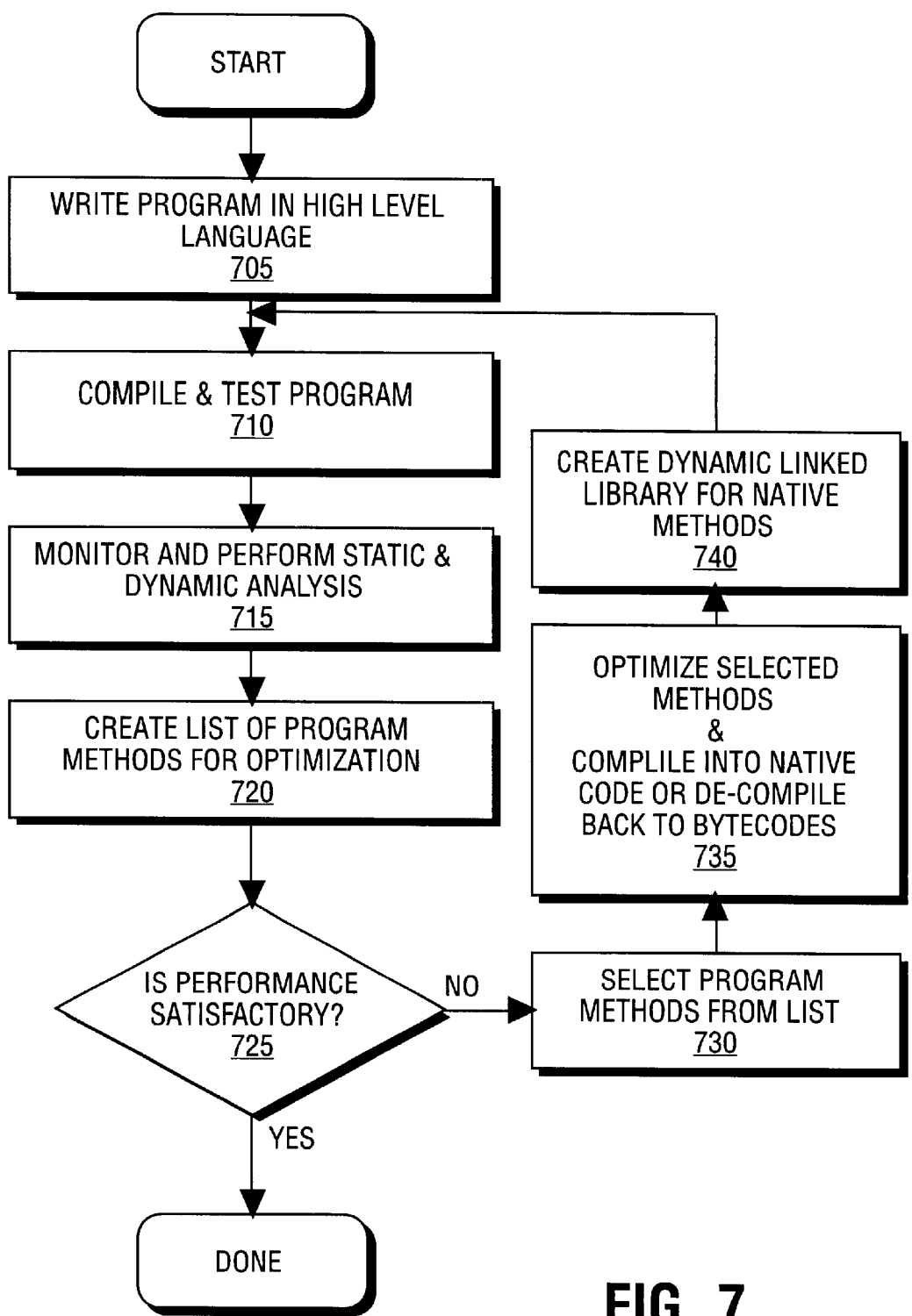
FIG. 7 is a flow chart illustrating the steps of profiling and optimizing computer program code in one embodiment of the present invention.

FIG. 7 is a flow chart illustrating the steps of profiling and optimizing computer program code in one embodiment of the present invention. A programmer would first write a computer program in the Java programming language in step 705. At step 710, the program would be compiled and tested/debugged. Then at step 715, the programmer may use a tuning and monitoring tool to monitor and perform static and dynamic analysis of the program's performance. A list of Java program methods that may improve program performance if optimized is generated at step 720. If the programmer finds that the performance is satisfactory at step 725, then development of the program is done. However, if the programmer decides to try to improve performance, then at step 730, he may select some of the Java program methods on the candidate list from step 720 for optimization. At step 735, the selected Java program methods are optimized and compiled into native processor code by a native Java compiler. Or alternatively, a user may decide to de-compile earlier native compiled code back to bytecode format. The de-compile process may be used for instance when a user determines that the native compiled code does not present the desired performance and the user wants to revert the native compiled code back to Java bytecode. A dynamic linked library (DLL) is created for the compiled native program methods at step 740. At this point, the development process may be complete. However, a programmer may repeat these steps to further refine and optimize the program. The process of monitoring and compiling bytecode/de-compiling native code may be repeated until the desired performance is obtained.

Figure 8:
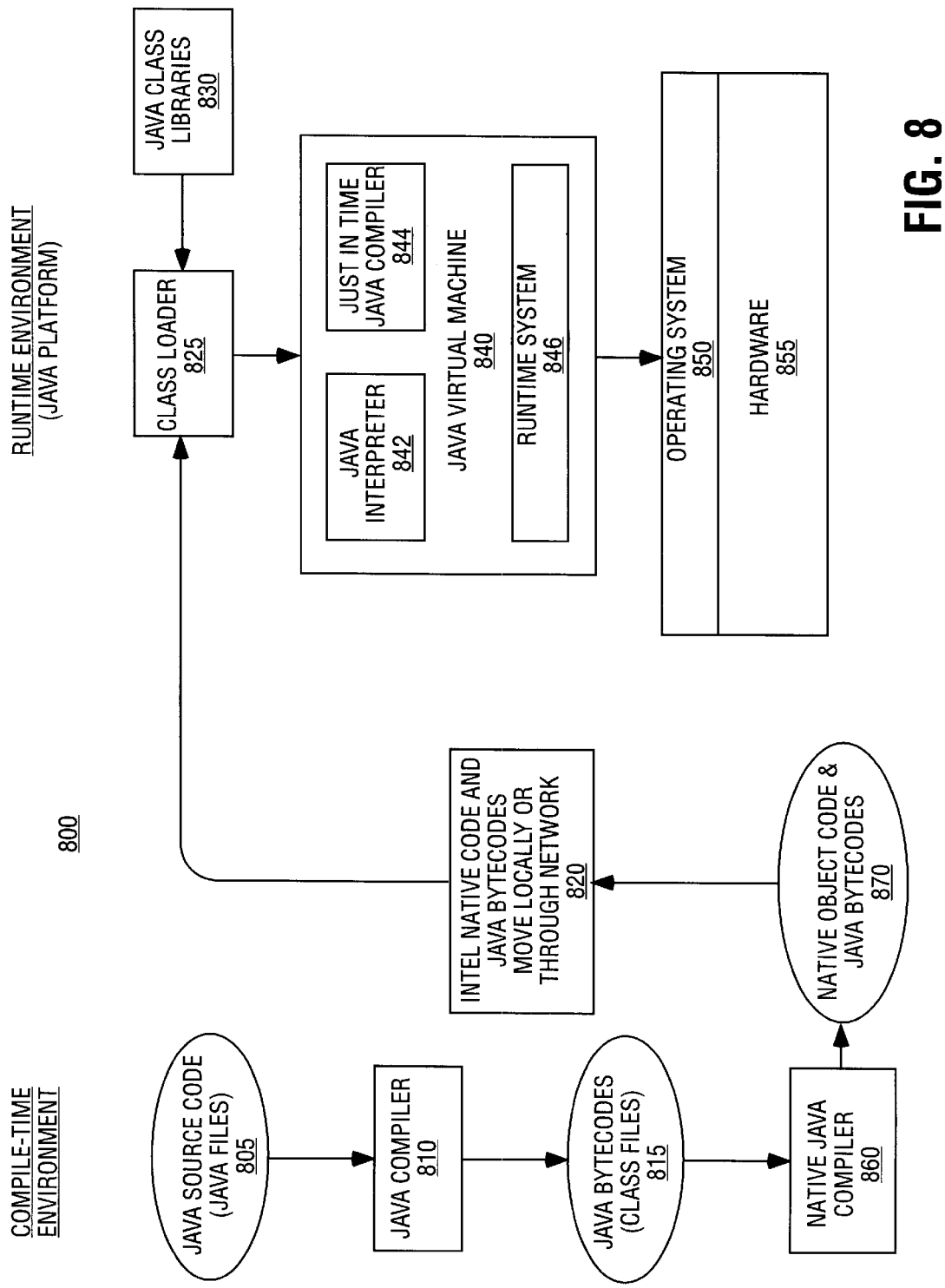
FIG. 8 is a block diagram illustrating one embodiment of the present invention in a Java Language development environment.

FIG. 8 is a block diagram illustrating one embodiment of the present invention in a Java Language development environment. The Java Language development environment shown comprises of a compile-time and a runtime environment. A programmer writes Java source code 805 and compiles the source code into Java bytecodes 815 with a Java compiler 810. In order to create an applet, a developer may store these bytecode files 815 on a HTTP server and add an <applet code=filename> tag to a Web page, which names the entry-point bytecode file. However, the programmer may decide to optimize or native compile certain Java program methods. The programmer would compile selected program methods with the native Java compiler 860 to generate native object code and Java bytecodes 870. When an end user visits that page, the <applet> tag causes the native object code and bytecode files to be transported over a network 820 from the server to the end user's browser in the Java Platform. In another embodiment, the native compiled code may be downloaded or transported into a client system by a browser via other mediums or methods. Furthermore, in other embodiments of the present invention may utilize some alternative file transfer protocol in downloading native compiled code so that a user could tune a Java program on a client system. At the Java Platform, the bytecodes are loaded 825 into memory and then verified for security before they enter the Java VM 840. Once the bytecodes are in the Java VM 840, they are interpreted by a Java interpreter 842 or turned into native machine code by the JIT compiler 844. The Java interpreter 842 and JIT compiler operate in the context of the runtime system 846 (threads, memory, and other system resources). Any classes from the Java Class Libraries 830 are dynamically loaded as needed by the applet.

Figure 9:
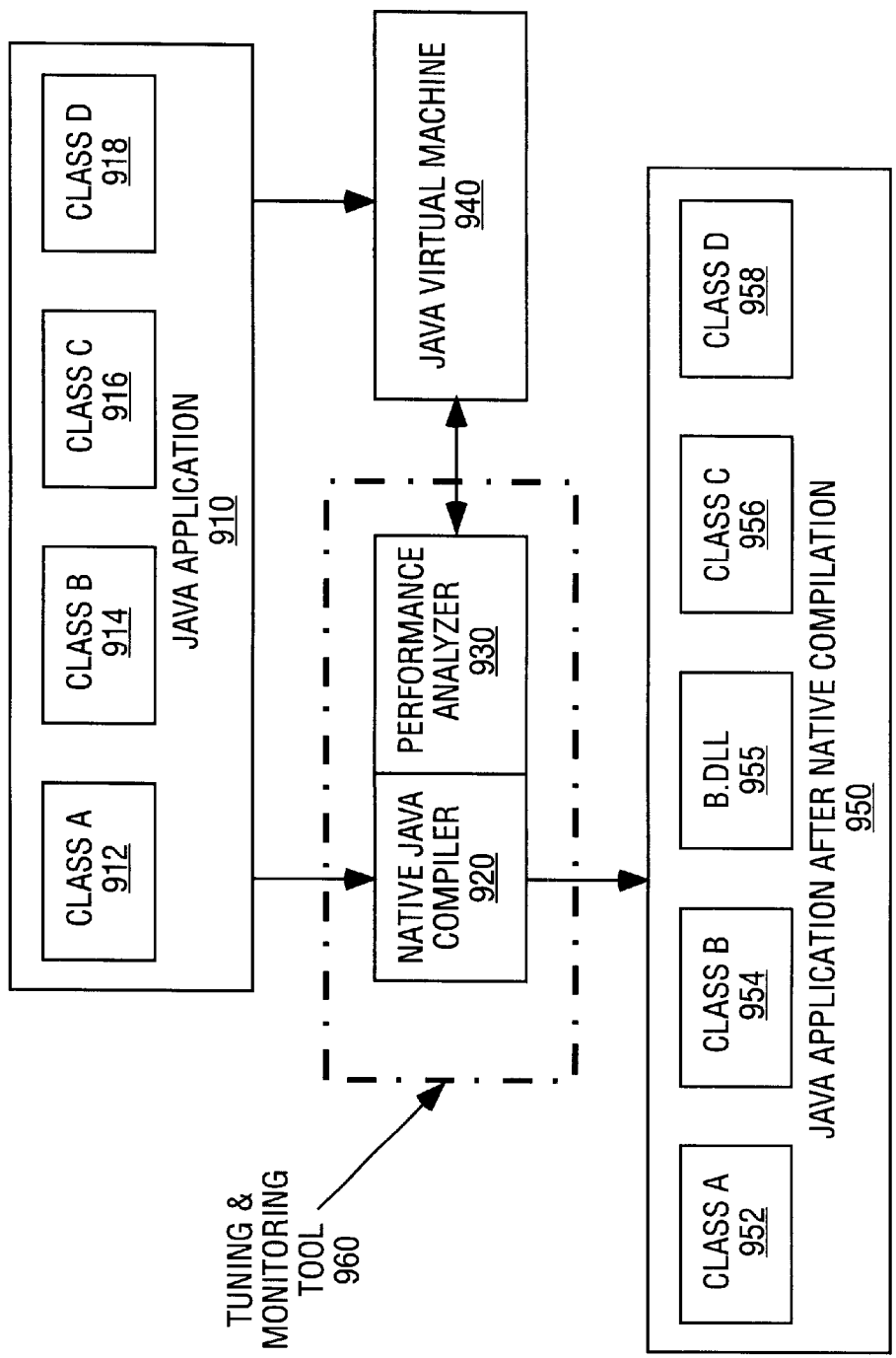
FIG. 9 is a block diagram illustrating one embodiment of the present invention in a Java visual tuning environment.

FIG. 9 is a block diagram illustrating one embodiment of the present invention in a Java visual tuning environment. In one embodiment of the present invention, a high level monitoring tool 960 monitors the performance of a Java application 910 and presents a list of possible Java program methods for optimization. A tuning and monitoring tool 960 may further comprise of a native Java compiler 920 and a performance analyzer 930. Based on the calling sequence of Java program methods and their execution time, plus static analysis done by the Java compiler, users could select any arbitrary number of highlighted methods for static compilation. The Java compiler may also use heuristics in static analysis—native interface overhead versus optimization gain.

For this example situation, a user has selected the Java program methods in Class B 914 of a Java application 910 for native compilation. The Java program methods that are selected for native compilation are first translated from Java bytecodes into native processor object code by a native Java compiler 920. The native object code could be built into a dynamic linked library (.DLL). In this case, B.dll 955 has been created from the native processor object code. In the Java application after native compilation 950, Class B 954 still exists because Class B 954 contains the right native attribute for the Java VM 940 to resolve calls. For the program methods that have been native compiled, the native Java compiler would change their attributes from the original class file, Class B 914. Suppose Class B contains a method X. When another program method calls X, the Java VM prepares the call differently when X is a Java program method versus a native compiled method. The Java VM uses the attribute associated with X to determine if X is a native compiled or a Java method. After the native compilation, class B is still needed even though the bytecode is already translated to native compiled code because of the attribute information. In one embodiment of the present invention, there may be mechanisms which facilitate the native compilation. For example, mechanisms to revert the native bit back to Java method, reporting the attribute state, and adding Java code to load the DLL. The native Java compiler may also optimize bytecodes statically for Java specific features and code sequences dynamically while calling a native method. After the original Java application 910 has been tuned, the precompiled Java program methods in the B.dll 955 could run concurrently with the rest of the Java bytecodes of the Java application 950 on a Java VM 940.

Figure 10:
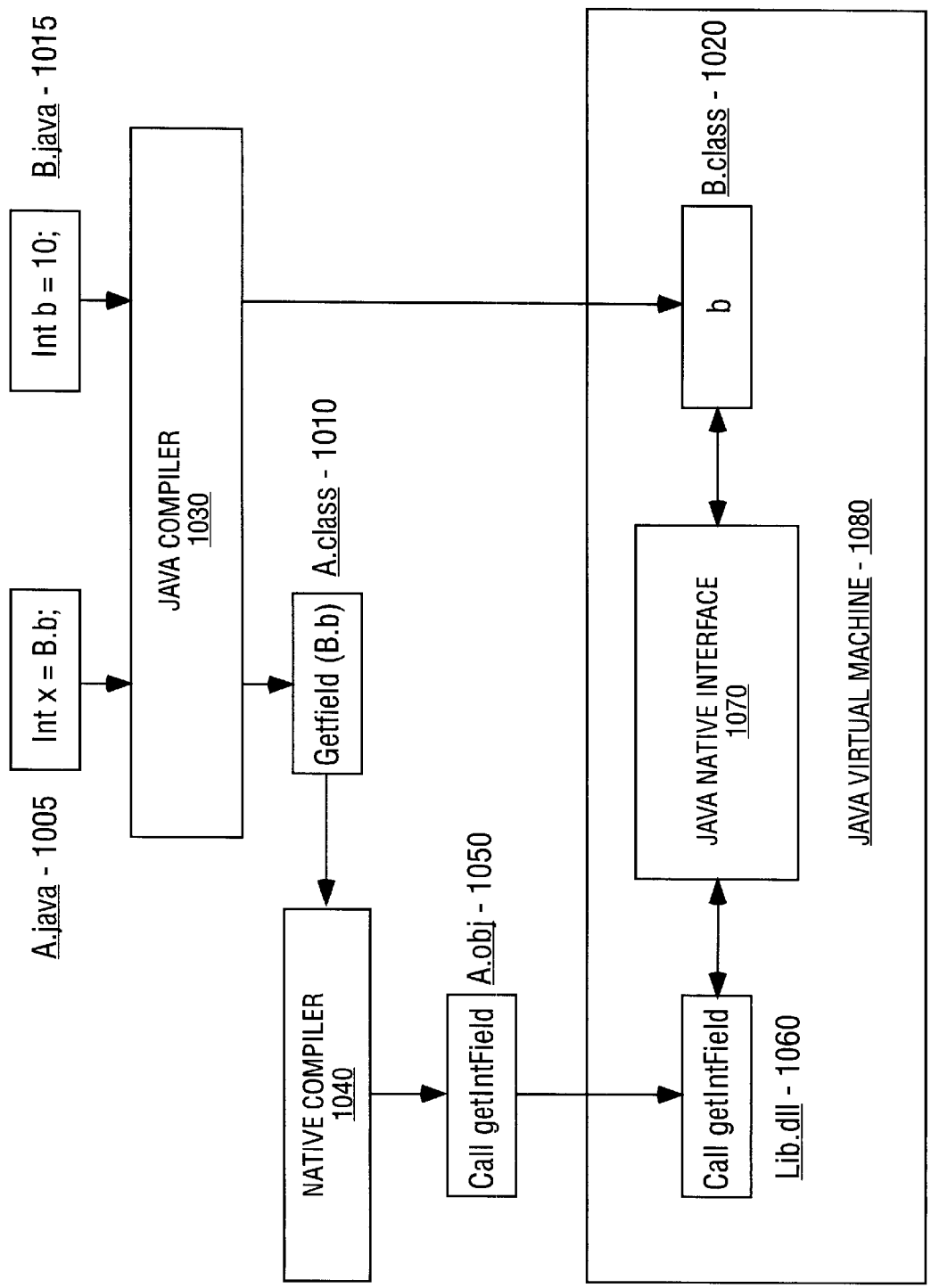
FIG. 10 is a block diagram illustrating one embodiment of the present invention in a native Java compilation model.

FIG. 10 is a block diagram illustrating one embodiment of the present invention in a native Java compilation model. In this example, a Java application is composed of two Java source code files—A.java 1005 and B.java 1015. These two source code files are compiled with a Java compiler 1030 to generate A.class 1010 and B.class 1020, respectively. The Java application comprising of these two class files 1010, 1020 may then be executed on a Java VM 1080. However, a programmer may decide to optimize the Java program method which has bytecode Getfield of 'a' from class B in A.class 1010. Hence what was originally Ajava 1005 is precompiled with the native compiler 1040 into native code A.obj and then Lib.dll 1060. Therefore, the Java application now comprises of Lib.dll 1060, A.class 1010, and B.class 1020 and may be executed on a Java VM 1080. When the method in A.class 1010 is native compiled, it needs to use the Java native interface 1070 to access the field b in class B 1020.

FIGS. 11*a*, 11*b*, and 11*c* are used to illustrate some outputs from a tuning and monitoring tool using the present invention in one embodiment. FIG. 11*a* illustrates the contents of an entry in a list file of candidates for native compiling in one embodiment of the present invention. The list file contains a list of Java program methods that are candidates for native compiling after static analysis is performed in the compiler. In the present embodiment, each line contains information about the candidate in three fields 1110, 1112, 1114. The first field 1110 contains the name of the class file containing the Java program method. The second field 1112 contains the name of the actual program method. An the third field 1114 contains a weight value. The weight is a number indicating the result of the static analysis that the compiler performed on the method. The higher the number, the better the performance gain the native compilation should bring.

In the present example, the tuning and monitoring tool would pass the list file in FIG. 11*b* to the native Java compiler. FIG. 11*b* illustrates an example of a list file before static analysis in the compiler in one embodiment of the present invention. The program methods, "handleEvent" method on line 1120 and "Point" method on line 1122, indicated in this list file are program methods that took a long time to run.

After the static analysis, the tuning and monitoring tool would see the list file in FIG. 11*c*. FIG. 11*c* illustrates an example of a list file after recommendations by a native Java compiler of methods for native compiling in one embodiment of the present invention. The "handleEvent" method on line 1130 have been given a weight of 0 and the "Point" method on line 1132 has a weight of 100. In this example, the native compiler only recommends that the "Point" method on line 1132 be native compiled.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative than a restrictive sense.

What is claimed is:

1. A method of optimizing program code performance comprising:
   monitoring performance of program code during program execution;
   creating a list of program functions for possible native code compilation;
   selecting a subset of program functions based on execution times of said program functions from said list for optimization and native code compilation; and
   precompiling said selected program functions into native program functions.

2. The method of claim 1 wherein said program functions comprise of Java class methods.

3. The method of claim 1 wherein said monitoring further comprises of:
   dynamically analyzing performance of said program code; and
   statically analyzing performance of said program code.

4. The method of claim 1 wherein said monitoring comprises of dynamically analyzing performance of said program code.

5. The method of claim 1 wherein said monitoring comprises of statically analyzing performance of said program code.

6. The method of claim 1 wherein said program code comprises of Java bytecodes.

7. The method of claim 1 further comprising storing said native program functions to be executed at a later time without having to recompile said program functions.

8. The method of claim 1 further comprising of calling said native program functions instead of said program functions during later program executions.

9. The method of claim 1 wherein said subset includes entire set of program functions on said list.

10. The method of claim 1 wherein said subset includes less than entire set of program functions on said list.

11. The method of claim 1 wherein said selecting comprises user interaction in evaluating said list.

12. A method of optimizing program performance comprising:
   monitoring performance of a computer program during program execution;
   creating a list of program class methods for possible native code compilation;
   selecting a subset of program class methods from said list based on execution times of said program class methods for optimization and native code compilation;
   precompiling said selected program class methods into native class methods; and
   storing said native class methods, said native class methods to be executed at a later time without having to be recompiled.

13. The method of claim 12 wherein said monitoring further comprises of:
   dynamically analyzing performance of said computer program; and
   statically analyzing performance of said computer program.

14. The method of claim 12 wherein said computer program comprises of Java bytecodes.

15. The method of claim 12 further comprising of calling said native class methods instead of said program class methods during later program executions.

16. The method of claim 12 wherein said subset included entire set of program class methods on said list.

17. The method of claim 12 wherein said subset includes less than entire set of program methods on said list.

18. A computer readable medium having embodied thereon a computer program, the computer program being executable by a machine to perform a method comprising:
   monitoring performance of program code during program execution;
   creating a list of program functions for possible native code compilation;
   selecting a subset of program functions from said list based on execution time of each program function for optimization and native code compilation; and
   precompiling said selected program functions into native program functions.

19. The computer readable medium having embodied thereon a computer program of claim 18 wherein said program functions comprise of Java class methods.

20. The computer readable medium having embodied thereon a computer program of claim 18 wherein said monitoring further comprises of:
   dynamically analyzing performance of said program code; and
   statically analyzing performance of said program code.

21. The computer program being executable by a machine of claim 18 to further perform calling said native program functions instead of said program functions during later program executions.

22. The computer program of claim 18 wherein said program code comprises of Java bytecodes.

23. The computer readable medium of claim 18 wherein said subset includes entire set of programs functions on said list.

24. The computer readable medium of claim 18 wherein said subset includes less than entire set of program functions on said list.

25. The method of claim 18 wherein said selecting comprising a user interactively reviewing and selecting program functions from said list.

26. A digital processing system having a processor operable to perform a method comprising:
   monitoring performance of program code during program execution;
   creating a list of program functions for possible native code compilation;
   selecting a subset of program functions from said list based on execution times for optimization and native code compilation; and
   precompiling said selected program functions into native program functions.

27. A digital processing system of claim 26 wherein said program functions comprise of Java class methods.

28. A digital processing system of claim 26 wherein said monitoring further comprises:
   dynamically analyzing performance of said program code; and
   staticlly analyzing performance of said program code.

29. The digital processing system of claim 26 to further perform calling said native program functions instead of said program functions during later program executions.

30. The digital processing system of claim 26 wherein said program code comprises of Java bytecodes.

31. The digital processing system of claim 26 wherein said subset includes entire set of program functions on said list.

32. The digital processing system of claim 26 wherein said subset includes less than entire set of program functions on said list.

* * * * *

UNITED STATES PATENT AND TRADEMARK OFFICE
CERTIFICATE OF CORRECTION

PATENT NO. : 6,289,506 B1  
DATED : September 11, 2001  
INVENTOR(S) : Kwong et al.

It is certified that error appears in the above-identified patent and that said Letters Patent is hereby corrected as shown below:

<u>Title page,</u>  
Item [57], ABSTRACT,  
Line 2, insert -- . -- before "A Java".

<u>Column 9,</u>  
Line 3, delete "in" after "Furthermore,".

Signed and Sealed this

Eighteenth Day of June, 2002

*Attest:*

JAMES E. ROGAN  
*Attesting Officer*     *Director of the United States Patent and Trademark Office*